(12) United States Patent
Dell

(10) Patent No.: US 7,547,024 B1
(45) Date of Patent: Jun. 16, 2009

(54) GAME TRANSPORTATION APPARATUS

(75) Inventor: Joseph R. Dell, P.O. Box 766, Leesport, PA (US) 19533

(73) Assignees: Joseph R. Dell, Westlake Village, CA (US); Miller Law Group, PLLC, West Lawn, PA (US)

( * ) Notice: Subject to any disclaimer, the term of this patent is extended or adjusted under 35 U.S.C. 154(b) by 534 days.

(21) Appl. No.: 11/271,307

(22) Filed: Nov. 10, 2005

(51) Int. Cl.
- B62B 9/04 (2006.01)
- B62B 13/00 (2006.01)
- B62B 15/00 (2006.01)
- B62B 17/00 (2006.01)
- B62B 19/00 (2006.01)
- B62M 27/00 (2006.01)
- B62M 29/00 (2006.01)
- A61D 3/00 (2006.01)

(52) U.S. Cl. .......................... 280/18; 119/725; 224/921

(58) Field of Classification Search ................. 224/921, 224/184; 43/58; D22/119; 280/18, 18.1, 280/19; 119/725
See application file for complete search history.

(56) References Cited

U.S. PATENT DOCUMENTS

| | | | |
|---|---|---|---|
| 4,283,068 A * | 8/1981 | Keyser | 280/19 |
| 4,431,121 A | 2/1984 | Bensette | 224/153 |
| 5,029,921 A | 7/1991 | Houghton | 294/26 |
| 5,145,224 A | 9/1992 | Welk | 294/2 |
| 5,295,556 A | 3/1994 | Mullin | 182/187 |
| 5,713,497 A | 2/1998 | Ponczek | 224/184 |
| 6,141,805 A * | 11/2000 | Fisher-Cohen et al. | 5/420 |
| 6,260,864 B1 | 7/2001 | Smith | 280/47.26 |
| 7,422,220 B2 * | 9/2008 | Walkingshaw et al. | 280/18 |

* cited by examiner

*Primary Examiner*—Michael R Mansen
*Assistant Examiner*—Monica L Williams

(57) ABSTRACT

An apparatus for removing the carcass of a slain large game animal, such as a deer, from the woods includes a polymer sheet that is placed beneath the carcass of the slain animal to reduce frictional forces associated with the dragging of the animal through the woods. The polymer sheet is formed with eyelets to permit the attachment of straps to fix the carcass to the top surface of the sheet. The polymer sheet can be rolled for storage in a quiver having caps screwed onto each opposing end thereof. When the sheet is to be utilized, the quiver is placed at the front edge of the sheet to stiffen and round the front edge so as to form a toboggan. A handle can be passed through the opened quiver to permit the apparatus to be dragged through the woods with a minimal amount of effort.

20 Claims, 2 Drawing Sheets

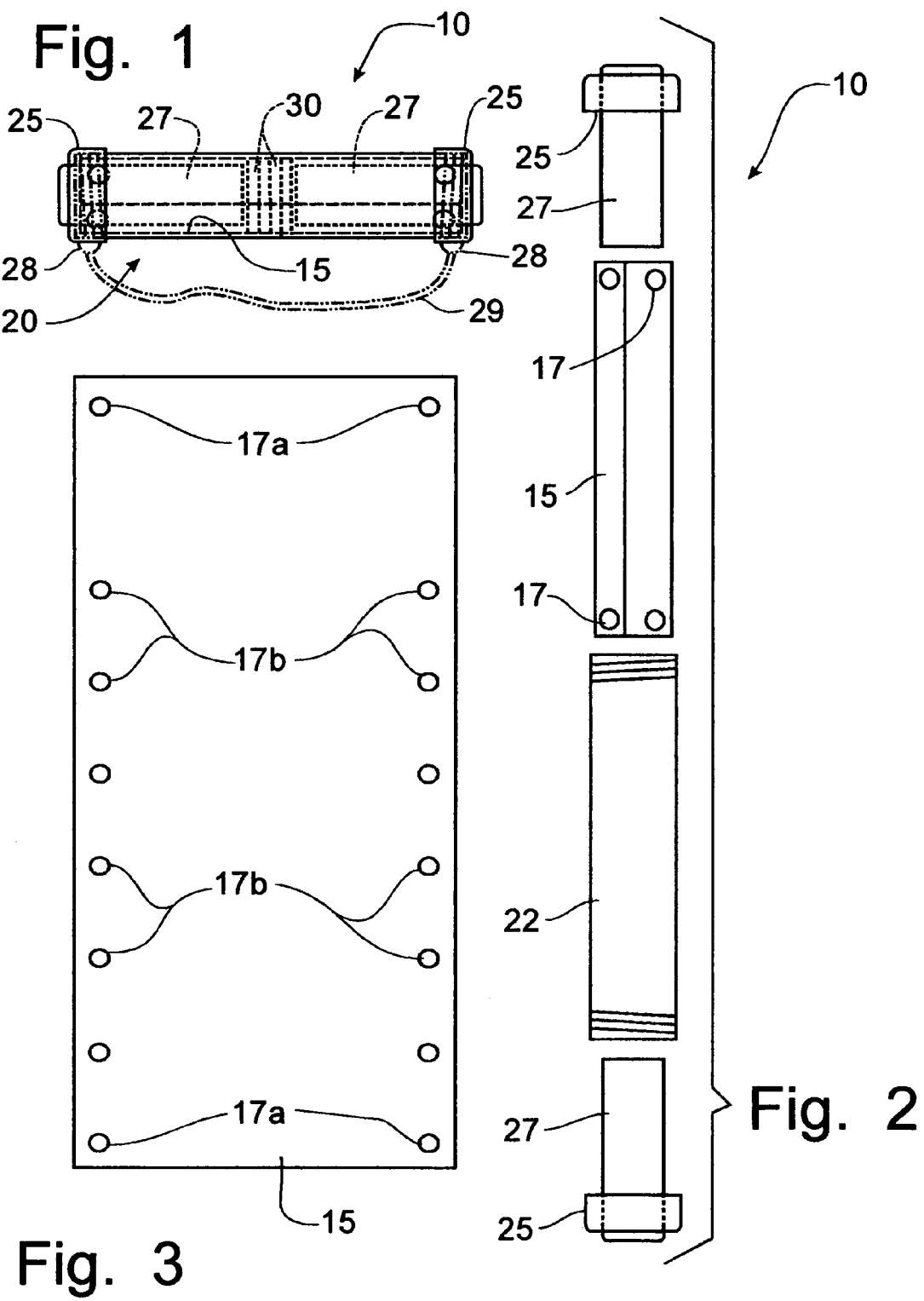

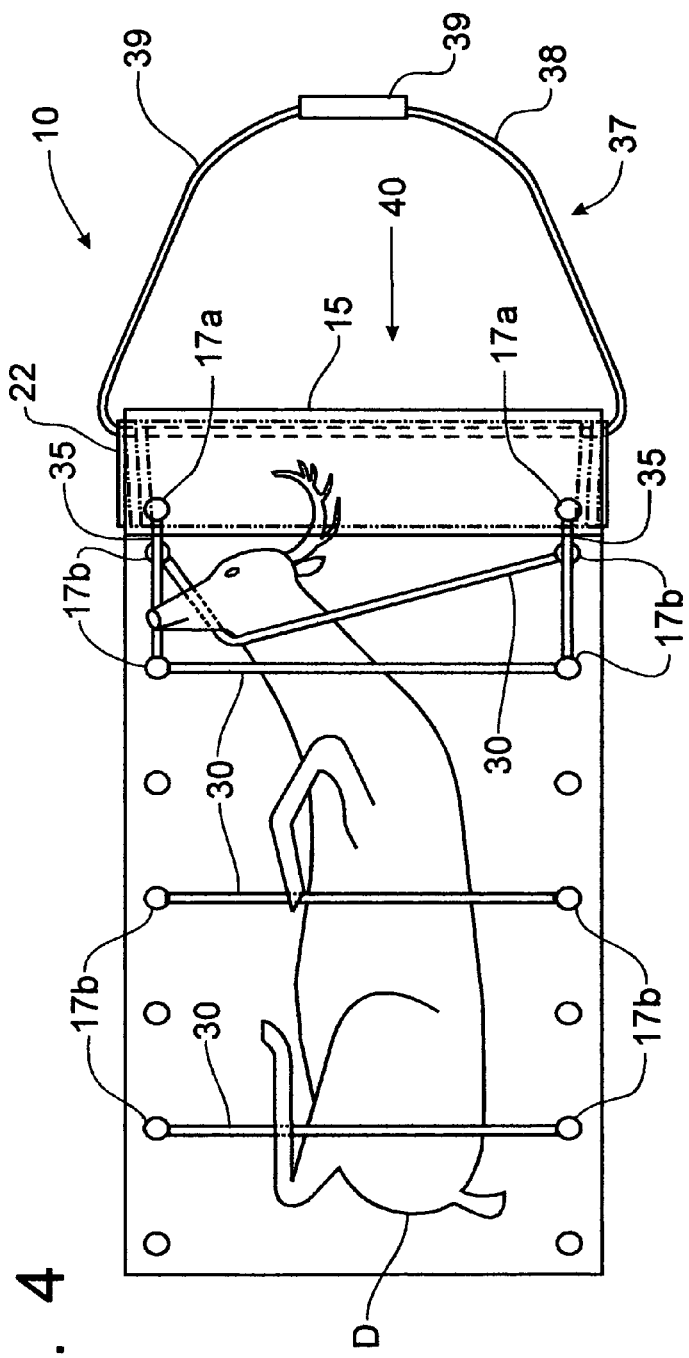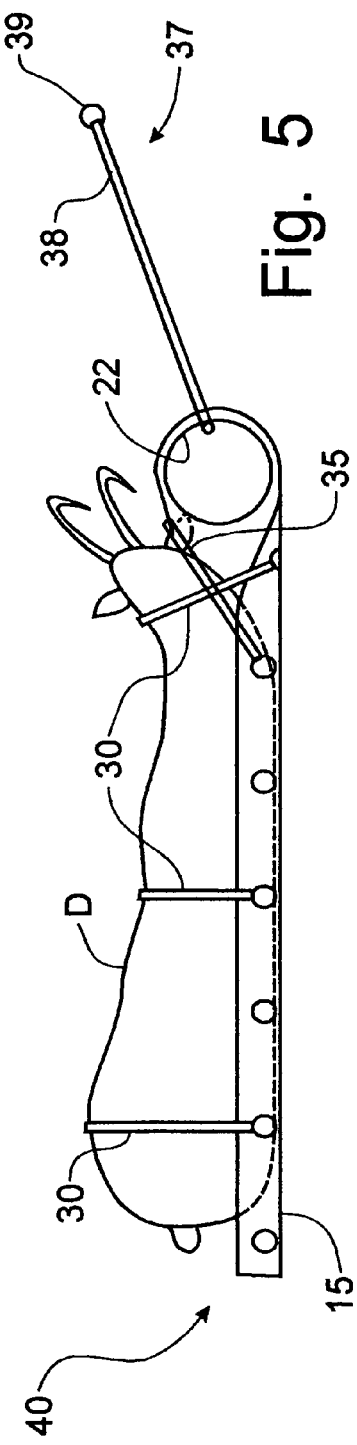

GAME TRANSPORTATION APPARATUS

BACKGROUND OF THE INVENTION

The present invention relates generally to a device for transporting large game, such as a slain deer, and, more particularly, to a polymer sheet stored in a quiver that is used to pull the large game animal over the uneven surface of the ground.

Hunters who are fortunate enough to harvest a large game animal, such as a whitetail deer, are typically sufficiently removed from civilization that the removal of the animal from the woods presents a substantial challenge. Conventional devices include a rope, with or without formed handles, that are typically tied or looped around the head of the animal and then used to drag the animal through the woods. A slain large game animal can weigh from one hundred to several hundred pounds and requires a significant effort to drag the animal over the surface of the ground, particularly when the animal must be moved uphill. The frictional forces between the ground and the animal, as well as the interference between objects on the ground, such as large rocks or logs or other irregular ground surface undulations, make dragging a slain large game animal over the ground a difficult task to accomplish.

Devices to facilitate dragging a deer can be found in U.S. Pat. No. 4,431,121, granted to Ernest Bensette on Feb. 14, 1984; in U.S. Pat. No. 5,029,921, granted to Robert Houghton, et al, on Jul. 9, 1991; and in U.S. Pat. No. 5,145,224, granted to Richard Welk on Sep. 8, 1992. In the Bensette patent, the hunter is equipped with a backpack-like device that includes a strap to attach to the deer so that the deer can be towed behind the hunter as he walks through the woods. In this particular apparatus, the deer is partially lifted and then dragged across the ground and any obstructions encountered thereby. A hook with a handle is disclosed in the Houghton patent to engage with the deer and permit a manual dragging of the deer over the surface of the ground. Other than providing an even distribution of the weight of the animal over the surface of the handle due to the positioning of the hook, the Houghton device is simply a tool for attachment to the deer to permit the deer to be dragged in a conventional manner. The improvement disclosed in the Welk patent is simply a handle for attachment of a rope interconnecting the deer and the handle to permit two people to drag the slain large game animal.

Wheeled carts are also within the state of the art, as can be seen in U.S. Pat. No. 5,295,556, issued to Daniel Mullin on Mar. 22, 1994; and in U.S. Pat. No. 6,260,864, issued to Phillip Smith on Jul. 17, 2001. Wheeled carts are particularly adaptable for use on relatively flat and unobstructed ground, but have limited use on typical woodland because of obstacles like rocks and logs that are not conducive to being easily traversed with wheeled implements. In U.S. Pat. No. 5,713,497, issued to Kevin Ponczek on Feb. 3, 1998, a modern version of a pole upon which the slain animal is carried by two people. The pole is manufactured to be broken down to permit carrying through the woods by a sling over the shoulder of the hunter.

Accordingly, it would be desirable to provide an apparatus to facilitate the removal of the carcass of a slain large game animal from the woods, which apparatus can be compactly stored and transported and easily utilized.

SUMMARY OF THE INVENTION

It is an object of this invention to provide an apparatus to facilitate the removal of a slain large game animal from the woods.

It is a feature of this invention that the apparatus includes a polymer sheet that can be rolled into a storage configuration within a quiver. It is an advantage of this invention that the apparatus can be compactly stored and easily deployed for the removal of a slain large game animal from the woods.

It is another feature of this invention that the quiver in which the polymer sheet is stored for transport is utilized as a front edge stiffener that supports a strap for pulling the sheet through the woods.

It is another advantage of this invention that the quiver positioned at the front edge of the polymer sheet enables the front edge of the sheet to be rounded and rigid to facilitate movement thereof over obstacles on the surface of the ground.

It is still another advantage of this invention that the quiver can be used to store miscellaneous hunting supplies internally of the rolled polymer sheet.

It is still another feature of this invention that the polymer sheet is formed with eyelets that permit attachment of straps that fix the carcass of the slain large game animal on the top surface of the polymer sheet.

It is yet another advantage of this invention that the frictional forces to pull the animal carcass over the surface of the ground is reduced due to the utilization of the polymer sheet beneath the animal for movement over the surface of the ground.

It is still another object of this invention to provide an apparatus for removing a slain large game animal from the woods, which is durable in construction, inexpensive of manufacture, carefree of maintenance, facile in assemblage, and simple and effective in use.

These and other objects, features and advantages are accomplished according to the instant invention by providing an apparatus for removing the carcass of a slain large game animal, such as a deer, from the woods in which a polymer sheet is placed beneath the carcass of the slain animal to reduce frictional forces associated with the dragging of the animal through the woods. The polymer sheet is formed with eyelets to permit the attachment of straps to fix the carcass to the top surface of the sheet. The polymer sheet can be rolled for storage in a quiver having caps screwed onto each opposing end thereof. When the sheet is to be utilized, the quiver is placed at the front edge of the sheet to stiffen and round the front edge so as to form a toboggan. A handle can be passed through the opened quiver to permit the apparatus to be dragged through the woods with a minimal amount of effort.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is an elevational view of a quiver storing a game transportation apparatus incorporating the principles of the instant invention, the optional sling being shown in phantom;

FIG. 2 is an exploded view of the quiver and game transportation sheet depicted in FIG. 1;

FIG. 3 is a plan view of the game transportation sheet in an unrolled state;

FIG. 4 is a top plan view of the game transportation apparatus in operation with a large game animal carcass strapped to the upper surface of the transportation sheet and the quiver positioned at the head of the game transportation sheet and strapped into position, a tow handle being passed through the opened quiver to permit a hunter to pull the apparatus through the woods, the game transportation sheet being shown in a flat unrolled state to clarify the orientation of the respective components; and FIG. 5 is a side elevational view of the game transportation apparatus depicted in FIG. 4, the sides of the game transportation sheet being shown in a curled state corresponding to the strapping of the large game carcass to the sheet.

DETAILED DESCRIPTION OF THE PREFERRED EMBODIMENT

Referring now to the drawings, a game transportation apparatus incorporating the principles of the instant invention can best be seen. The game transportation apparatus 10 includes a rectangular sheet of polymer material 15 that has some rigidity, yet is capable of being rolled into circular configuration for storage. One example of such polymer material is the "Easy Bagger Portable Trash Can" marketed by Lawson Products, Inc. of Indianapolis, Ind., which is made from recycled plastic materials formed with a smooth surface on one side of the sheet and a rough surface on the opposing side. Other similar materials are equally suitable provided the formed polymer sheet is capable of holding eyelets 17, as described below, and will function as described in greater detail below.

The polymer sheet 15 is preferably formed with a plurality of spaced attachment member, such as eyelets 17, located along the opposing long sides of the rectangular polymer sheet 15 to permit the attachment of straps 30, 35 or other fastening devices in the operation of the polymer sheet 15 to transport slain large game animals out of the woods, as will be described in greater detail below. The number and size of the eyelets 17 is dependant on the ability of the polymer material to hold the eyelets 17 without tearing out of the sheet 15 and on the size of the rectangular sheet 15. Preferably, at least one eyelet 17a is located near each end of the sheet 15 on each opposing side of the sheet 15, and at least three to five additional interior eyelets 17b along the edge of the sheet 15, as is depicted in FIG. 2.

The polymer sheet 15 can be rolled into a circular configuration to fit internally within a quiver 20 having a length that will accommodate the width of the polymer sheet, such as approximately 30-36 inches, and a diameter that will permit the polymer sheet 15 to be stored therein in a rolled configuration, such as approximately 4-6 inches, as is depicted in FIGS. 1 and 2. The quiver 20 is preferably formed of a light, yet durable, material, such as aluminum or plastic, which will hold the circular shape when utilized at the head of the game transportation sheet 15, as will be discussed in greater detail below. The ends of the quiver barrel 22 are preferably threaded to permit the attachment of end caps 25 on each end to seal the barrel 22 from moisture and debris. For example, the quiver barrel 22 and end caps 25 could be manufactured from polyvinyl chloride (PVC) plastic material that can be threaded and is light and durable to function as described below. A deluxe version of the apparatus 10 could have the barrel 22 and end caps 25 manufactured from aluminum.

Each end cap 25 can be formed with a container 27 that is detachably mounted on the inside of the end cap 25, such as by threading the container 27 onto a mount (not shown) formed on the interior of the end cap 25. The container 27 is formed with a diameter that is substantially smaller than the diameter of the quiver barrel 22 so that the container will fit internally of the rolled-up polymer sheet 15 stored within the quiver 20. The container 27 can be specialized to hold liquid, such as an insulated thermos bottle, or simply be a vessel for the storage of loose items, such as a first aid kit, compass, knife, tools, etc. Preferably, when the containers 27 are mounted on the ends of the quiver barrel 22, the quiver 20 retains an open space between the opposing containers 27 to permit the storage of rolled straps 30 and tow handle 37, although the straps 30 and tow handle 37 could be stored loose within the containers 27 as well.

The assembled quiver 20 with end caps 25 mounted thereon, containers 27 stored therein, along with the rolled-up polymer sheet 15, presents a compact cylindrical package that can be easily transported through the woods by a hunter or other user of the apparatus. The end caps 25 can be provided with attachment rings 28 to which a carrying strap or sling 29 can be attached, as depicted in phantom in FIG. 1, to facilitate the transport of the quiver 20 from one location to another. The provision of the detachable carrying strap 29 interconnecting the respective end caps 25 also provides a means by which the end caps 25 and associated containers 27 can be attached to the apparatus 10 or carried by the hunter in a compact and convenient manner.

In utilization, as is best seen in FIGS. 4 and 5, the quiver 20 is opened at both ends thereof by the removal of the end caps 25 and the attached containers 27, if so equipped. The polymer sheet 15 is removed from the quiver 20 and unrolled into a flat (or nearly flat) sheet, with reverse rolling being helpful in restoring the polymer sheet 15 into a relatively flat configuration, preferably with a smooth side against the surface of the ground to enhance movement thereof over the ground. The polymer sheet 15 is then positioned under the slain animal D carcass by sliding the sheet 15 under the animal D and/or by rolling the animal D onto the sheet 15.

The quiver barrel 22 is then positioned at one end of the sheet 15 so that the sheet 15 can be rolled around the outer circumferential surface of the barrel 22, as is depicted in FIGS. 4 and 5. The end eyelets 17a at the end of the sheet 15 are then fastened by suitable straps 35 to appropriate interior eyelets 17b to capture the quiver barrel 22 within the wrapped-around polymer sheet 15 and form a toboggan 40 on which the slain animal carcass D is riding. By positioning the strap 35 in a diagonally extending direction, as is shown in FIGS. 4 and 5, the strap 35 provides some resiliency to the toboggan 40, particularly when the rigid front end formed by the captured quiver barrel 22 encounters an obstacle on the ground. The animal D is then strapped to the polymer sheet 15 by additional straps 30 that span from one side of the sheet 15 to the other and tend to wrap the animal D within the polymer sheet 15, as is depicted in FIG. 5.

A tow handle 37 is then passed through the opened quiver barrel 22 to extend forwardly of the formed toboggan 40 and permit the hunter to then pull the toboggan 40 with the animal D strapped thereto over the surface of the ground. Preferably, the tow handle is formed from a rope 38, such as a nylon rope, that is threaded through a tubular grip 39 and then knotted to form a continuous loop extending through the grip 39 and through the quiver barrel 40. In the alternative, a specially formed rope having a handle (not shown) at each end could be passed through the quiver barrel and used to pull the toboggan 40 over the ground.

Since the quiver barrel 22 provides a rigid front nose of the toboggan 40, the toboggan 40 holds its shape while being slid over the surface of the ground. The polymer sheet 15 provides a lower coefficient of friction with respect to the ground than would the slain animal D. Obstacles, such as rocks, small logs, and other undulations in the ground surface, are easily traversed by the rigid nose of the toboggan 40 formed by the captured quiver barrel 22 without catching the legs or antlers of the slain animal D. One or two persons can pull the tow handle 37 to move the toboggan 40 over the ground.

Once the animal D has been moved to the selected location for transfer to a vehicle or other mode of conveyance, the polymer sheet 15 can be easily cleaned of blood and/or debris, dried and then returned to the interior of the quiver barrel 22. With the end caps 25 re-mounted on the respective ends of the barrel 22, the quiver 20 is returned to the compact stored configuration depicted in FIG. 1.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A game transportation apparatus comprising:
   a polymer sheet configurable into a substantially flat configuration and a rolled configuration, said polymer sheet having first attachment members at one end of said polymer sheet and second attachment members spaced along opposing sides thereof, said polymer sheet having a width dimension defining a distance between said opposing sides;
   a rigid quiver barrel having a length dimension at least as large as said width dimension of said polymer sheet, said quiver barrel having a generally tubular configuration permitting a storage of said polymer sheet internally of said barrel when in said rolled configuration;
   a pair of removable end caps adapted to be mounted on opposing ends of said quiver barrel to close selectively said quiver barrel;
   first fastening members interconnecting said first attachment members and selected second attachment members to wrap said polymer sheet around said quiver barrel when said polymer sheet is in said substantially flat configuration to form a toboggan configuration; and
   second fastening members interconnecting selected opposing second attachment members to attach a slain animal carcass to said polymer sheet, wherein said quiver barrel establishes a rigid member at a forward end of said toboggan configuration to deflect over objects encountered as said slain animal is being transported over the ground.

2. The game transportation apparatus of claim 1 wherein said attachment members are eyelets mounted in said polymer sheet along said opposing sides thereof.

3. The game transportation apparatus of claim 2 wherein said first and second fastening members are elongated straps.

4. The game transportation apparatus of claim 1 wherein said end caps are threaded onto said quiver barrel.

5. The game transportation apparatus of claim 4 further comprising a containers sized to fit internally of said polymer sheet when in said rolled configuration stored within said quiver barrel.

6. The game transportation apparatus of claim 5 wherein at least one of said end caps has said container mounted thereto so as to be removable therewith.

7. The game transportation apparatus of claim 5 wherein said end caps have a sling attached thereto interconnecting said end caps.

8. A large game transport device comprising:
   a polymer sheet configurable into a substantially flat configuration, said polymer sheet having first attachment members at one end of said polymer sheet and second attachment members spaced along opposing sides thereof, said polymer sheet having a width dimension defining a distance between said opposing sides;
   a rigid tubular quiver barrel having a length dimension substantially equal to said width dimension of said polymer sheet, said quiver barrel being positioned at one end of said polymer sheet with said polymer sheet wrapped around said quiver to form a toboggan with said quiver barrel defining a rigid member at a forward end of said toboggan;
   first attachment members interconnecting said first attachment members and selected second attachment members to maintain said polymer sheet wrapped around said quiver barrel; and
   a tow member extending from each opposing end of said quiver barrel to permit said toboggan to be dragged along the ground with said rigid member deflecting objects encountered thereby.

9. The large game transport device of claim 8 further comprising second fastener members interconnecting selected attachment members to restrain a slain large game animal on said toboggan.

10. The large game transport device of claim 9 wherein said polymer sheet is selectively configured into a rolled configuration storable within said quiver barrel, said large game transport device further comprising end caps adapted to be connected to opposing ends of said quiver barrel to close said quiver barrel.

11. The large game transport device of claim 10 wherein said attachment members are eyelets mounted in said polymer sheet along opposing sides thereof, said first and second fastening members being elongated straps.

12. The large game transport device of claim 11 further comprising a container sized to fit internally of said polymer sheet when in said rolled configuration stored within said quiver barrel.

13. The large game transport device of claim 12 wherein said container is mounted to one of said end caps to be removable therewith.

14. The large game transport device of claim 13 further comprising a sling interconnecting said end caps.

15. A method of transporting a slain large game animal over the surface of the ground utilizing a rigid quiver barrel having stored therein a flexible polymer sheet in a rolled configuration, first and second fastener members and a tow member, comprising the steps of:
   removing said polymer sheet from said quiver barrel and converting said polymer sheet into a substantially flat configuration;
   positioning said quiver barrel at one end of said polymer sheet;
   wrapping said one end of said polymer sheet around said quiver barrel;
   connecting first fastener members between selected attachment members on said polymer sheet to maintain said polymer sheet wrapped around said quiver barrel;
   restraining said game animal on said polymer sheet by second fastener members interconnecting selected attachment members on opposing sides of said polymer sheet; and attaching said tow member to said quiver barrel to pull said quiver barrel with said game animal supported on said polymer sheet over the surface of the ground.

16. The method of claim 15 wherein said attaching step includes the step of passing said tow member through said quiver barrel so that said tow member extends from each opposing end of said quiver barrel.

17. The method of claim 16 wherein said quiver barrel is provided with end caps detachably mounted on said opposing ends thereof, said removing step including the step of detaching at least one of said end caps from said quiver barrel before accessing said polymer sheet.

18. The method of claim 17 wherein said end caps have mounted thereon containers sized to fit internally of said polymer sheet when stored within said quiver barrel in said rolled configuration, said containers being removed during said detaching step.

19. The method of claim 18 wherein said polymer sheet can be returned to said rolled configuration after said game animal is removed therefrom and stored within said quiver barrel with said end caps re-attached to said opposing ends of said quiver barrel with said containers positioned internally of said polymer sheet by the steps of:

disconnecting said first fastener members to permit said one end of said polymer sheet to unwrap from said quiver barrel;

rolling said polymer sheet into said rolled configuration;

positioning said polymer sheet while in said rolled configuration into said quiver barrel until said polymer sheet is entirely within said quiver barrel;

returning said fastener members into said quiver barrel internally of said polymer sheet; and re-attaching each said end cap on one of said opposing ends of said quiver barrel with said container oriented internally of said polymer sheet.

20. The method of claim 19 further comprising the step of interconnecting said end caps with a sling to permit said quiver barrel to be carried conveniently.

* * * * *